United States Patent
Eckl

(10) Patent No.: US 10,087,939 B2
(45) Date of Patent: *Oct. 2, 2018

(54) TURBOCHARGER SYSTEMS WITH DIRECT TURBINE INTERFACES

(71) Applicant: HONEYWELL INTERNATIONAL INC., Morristown, NJ (US)

(72) Inventor: Filip Eckl, Dolni Kounice (CZ)

(73) Assignee: Garrett Transportation I Inc., Torrance, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/805,154

(22) Filed: Jul. 21, 2015

(65) Prior Publication Data

US 2017/0022993 A1    Jan. 26, 2017

(51) Int. Cl.
*F04D 25/16* (2006.01)
*F04D 17/02* (2006.01)
(Continued)

(52) U.S. Cl.
CPC ......... *F04D 17/025* (2013.01); *F01D 25/243* (2013.01); *F02B 37/004* (2013.01); *F02C 6/12* (2013.01); *F05D 2220/40* (2013.01); *F05D 2230/642* (2013.01); *F05D 2240/55* (2013.01); *F05D 2250/311* (2013.01);
(Continued)

(58) Field of Classification Search
CPC ........ F04D 17/025; F01D 25/243; F02C 6/12; F05D 2220/40; F05D 2230/642; F05D 2240/55; F05D 2250/311; F05D 2250/36; F05D 2250/51; F05D 2250/52; F05D 2250/611; F05D 2250/39
See application file for complete search history.

(56) References Cited

U.S. PATENT DOCUMENTS 2,170,974 A * 8/1939 Parkins .................... F02D 9/00
                                                     123/562
2,743,578 A    5/1956 Hazen
(Continued)

FOREIGN PATENT DOCUMENTS

DE        19948220 A1    1/2001
DE     102004061030 A1    6/2006
(Continued)

OTHER PUBLICATIONS

Extended EP Search Report for Application No. 16179365.8-1607 dated Nov. 30, 2016.
(Continued)

*Primary Examiner* — Kenneth Bomberg
*Assistant Examiner* — Brian Delrue
(74) *Attorney, Agent, or Firm* — Lorenz & Kopf, LLP

(57) ABSTRACT

Turbine assemblies and related turbocharger systems having direct turbine interfaces are provided. One exemplary turbine assembly includes a first turbine housing having an outlet portion defining a fluid outlet of a first turbine and a second turbine housing having an inlet portion defining a fluid inlet of a second turbine, wherein at least a portion of the outlet portion radially surrounds at least a portion of the inlet portion to provide a direct interface from the fluid outlet of the first turbine to the fluid inlet of the second turbine in an axial direction.

20 Claims, 5 Drawing Sheets

(51) Int. Cl.
*F02C 6/12* (2006.01)
*F01D 25/24* (2006.01)
*F02B 37/00* (2006.01)

(52) U.S. Cl.
CPC ...... *F05D 2250/36* (2013.01); *F05D 2250/51* (2013.01); *F05D 2250/52* (2013.01); *F05D 2250/611* (2013.01); *F05D 2260/39* (2013.01); *Y02T 10/144* (2013.01)

(56) References Cited

U.S. PATENT DOCUMENTS

| | | | |
|---|---|---|---|
| 3,289,436 A | 12/1966 | Groves et al. | |
| 4,032,262 A | 6/1977 | Zehnder | |
| 4,155,684 A | 5/1979 | Curiel et al. | |
| 4,196,593 A | 4/1980 | Froeliger | |
| 4,339,922 A | 7/1982 | Navarro | |
| 4,344,289 A | 8/1982 | Curiel et al. | |
| 4,400,945 A | 8/1983 | Deutschmann et al. | |
| 4,464,902 A | 8/1984 | Mendle et al. | |
| 4,496,291 A | 1/1985 | Grimmer | |
| 4,563,132 A | 1/1986 | Grimmer | |
| 4,679,992 A | 7/1987 | Watanabe et al. | |
| 5,119,633 A * | 6/1992 | Brooks | B60T 1/08 60/602 |
| 6,802,184 B2 | 10/2004 | Huter et al. | |
| 7,043,915 B2 | 5/2006 | Anello | |
| 7,287,379 B2 | 10/2007 | Gobert et al. | |
| 7,334,799 B2 * | 2/2008 | O'Hara | F01D 11/003 277/361 |
| 9,188,091 B2 * | 11/2015 | Matzen | F02M 35/10334 |
| 9,228,439 B2 * | 1/2016 | Pointon | F01D 5/186 |
| 2005/0211942 A1 * | 9/2005 | Koester | F16K 5/0678 251/315.01 |
| 2009/0003995 A1 * | 1/2009 | Petitjean | F01D 11/003 415/157 |
| 2012/0321450 A1 * | 12/2012 | Aschenbruck | F01D 9/023 415/174.2 |
| 2014/0083096 A1 * | 3/2014 | Andersson | F02D 41/0077 60/605.2 |
| 2014/0314590 A1 * | 10/2014 | Ising | F02B 37/013 417/405 |
| 2015/0292345 A1 * | 10/2015 | Giselmo | F01D 11/04 415/111 |

FOREIGN PATENT DOCUMENTS

| | | | |
|---|---|---|---|
| EP | 0477579 A2 | 4/1992 | |
| GB | 1438172 | 6/1976 | |
| JP | 60116821 A | 6/1985 | |
| JP | 02125927 A | 5/1990 | |
| JP | 2005120936 A | 5/2005 | |
| JP | 2005120937 A | 5/2005 | |
| JP | 2005133651 A | 5/2005 | |
| WO | 2004101971 A1 | 11/2004 | |
| WO | WO 2014079466 A1 * | 5/2014 | F01D 11/04 |

OTHER PUBLICATIONS

Extended EP Search Report for Application No. 16179366.6-1607 dated Nov. 30, 2016.
EP Examination for Application No. 16 179 366.6.-1607 dated Jul. 6, 2017.
EP Examination for Application No. 16 179 365.8.-1607 dated Jul. 20, 2017.
USPTO Interview Summary for U.S. Appl. No. 14/805,145 dated Oct. 23, 2017.
USPTO Office Action for U.S. Appl. No. 14/805,145 dated Jul. 28, 2017.
Final Office Action for U.S. Appl. No. 14/805,145 dated Jan. 22, 2018.
EP Office Action for Application No. 16179365.8 dated Jan. 5, 2018.
EP Office Action for Application No. 16179366.6 dated May 3, 2018.

* cited by examiner

TURBOCHARGER SYSTEMS WITH DIRECT TURBINE INTERFACES

CROSS-REFERENCE TO RELATED APPLICATIONS

The subject matter described here is related to the subject matter described in U.S. patent application Ser. No. 14/805,145, filed concurrently herewith.

TECHNICAL FIELD

The subject matter described herein relates generally to flow control systems, and more particularly, to turbocharger systems with direct turbine-to-turbine interfaces.

BACKGROUND

Turbocharger systems are frequently used to improve the efficiency of internal combustion engines. Two-stage turbocharger systems can be used to further improve the engine efficiency over a single-stage turbocharger system including a single turbine and a single compressor. While use of two-stage turbocharger systems may be desirable in automotive vehicles, for example, to achieve fuel economy targets or other environmental goals, the combination of the added financial cost in conjunction with the size, packaging, assembly, or installation constraints can be prohibitive. However, designers of turbocharger systems are often faced with competing concerns regarding the mass flow through the turbines involved with the particular application or other factors that could impact the performance or reliability of the turbocharger system while in use. Accordingly, it is desirable to provide a two-stage or multi-stage turbocharger system that is capable of achieving the desired gas flow and related reliability or performance targets while also reducing the size, packaging, assembly, installation, or other costs associated therewith.

BRIEF SUMMARY

Turbine assemblies and related turbocharger systems having direct turbine interfaces are provided. An exemplary turbine assembly includes a first turbine housing having an outlet portion defining a fluid outlet of a first turbine and a second turbine housing having an inlet portion defining a fluid inlet of a second turbine, wherein at least a portion of the inlet portion radially surrounds at least a portion of the outlet portion to provide a direct interface from the fluid outlet of the first turbine to the fluid inlet of the second turbine in an axial direction.

An embodiment of one exemplary turbocharger system is also provided. The turbocharger system includes a first compressor, a first turbine coupled to the first compressor and having a first common rotational axis therewith, a second turbine, and a second compressor coupled to the second turbine and having a second common rotational axis therewith, wherein the first common rotational axis and the second common rotational axis are concentric. The outlet of the first turbine being inserted within the inlet of the second turbine to provide a direct fluid interface for gas flow from the first turbine to the second turbine.

Another exemplary embodiment of a turbocharger system includes a first compressor and a radial turbine having a first turbine wheel coupled to the first compressor via a first rotary shaft. The radial turbine includes a first turbine housing defining a radial fluid inlet and an axial fluid outlet. The turbocharger system also includes a second compressor and an axial turbine having a second turbine wheel coupled to the second compressor via a second rotary shaft aligned with the first rotary shaft in an axial direction. The axial turbine includes a second turbine housing defining an axial fluid inlet, wherein at least a portion of an axial inlet portion of the second turbine housing radially surrounds at least a portion of an axial outlet portion of the first turbine housing to provide a direct fluid interface between the axial fluid outlet and the axial fluid inlet. The turbocharger system also includes a sealing structure hermetically sealing the portion of the axial inlet portion to the first turbine housing.

In another exemplary embodiment, a turbine assembly includes a first turbine housing having an outlet portion defining a fluid outlet of a first turbine and a second turbine housing having an inlet portion defining a fluid inlet of a second turbine, wherein at least a portion of the outlet portion radially surrounds at least a portion of the inlet portion to provide a direct interface from the fluid outlet of the first turbine to the fluid inlet of the second turbine in an axial direction.

In yet another embodiment, a turbocharger system includes a first compressor, a first turbine coupled to the first compressor and having a first common rotational axis therewith, a second turbine, and a second compressor coupled to the second turbine and having a second common rotational axis therewith, wherein the first common rotational axis and the second common rotational axis are concentric. The second turbine has an inlet inserted within an outlet of the first turbine to provide a direct fluid interface for gas flow from the first turbine to the second turbine.

Another embodiment of a turbocharger system includes a first compressor and a radial turbine having a first turbine wheel coupled to the first compressor via a first rotary shaft. The radial turbine includes a first turbine housing defining a radial fluid inlet and an axial fluid outlet. The turbocharger system also includes a second compressor and an axial turbine having a second turbine wheel coupled to the second compressor via a second rotary shaft aligned with the first rotary shaft in an axial direction. The axial turbine includes a second turbine housing defining an axial fluid inlet, wherein at least a portion of an axial outlet portion of the first turbine housing radially surrounds at least a portion of an axial inlet portion of the second turbine housing to provide a direct fluid interface between the axial fluid outlet and the axial fluid inlet. The turbocharger system also includes a sealing structure hermetically sealing the portion of the axial outlet portion to the second turbine housing.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
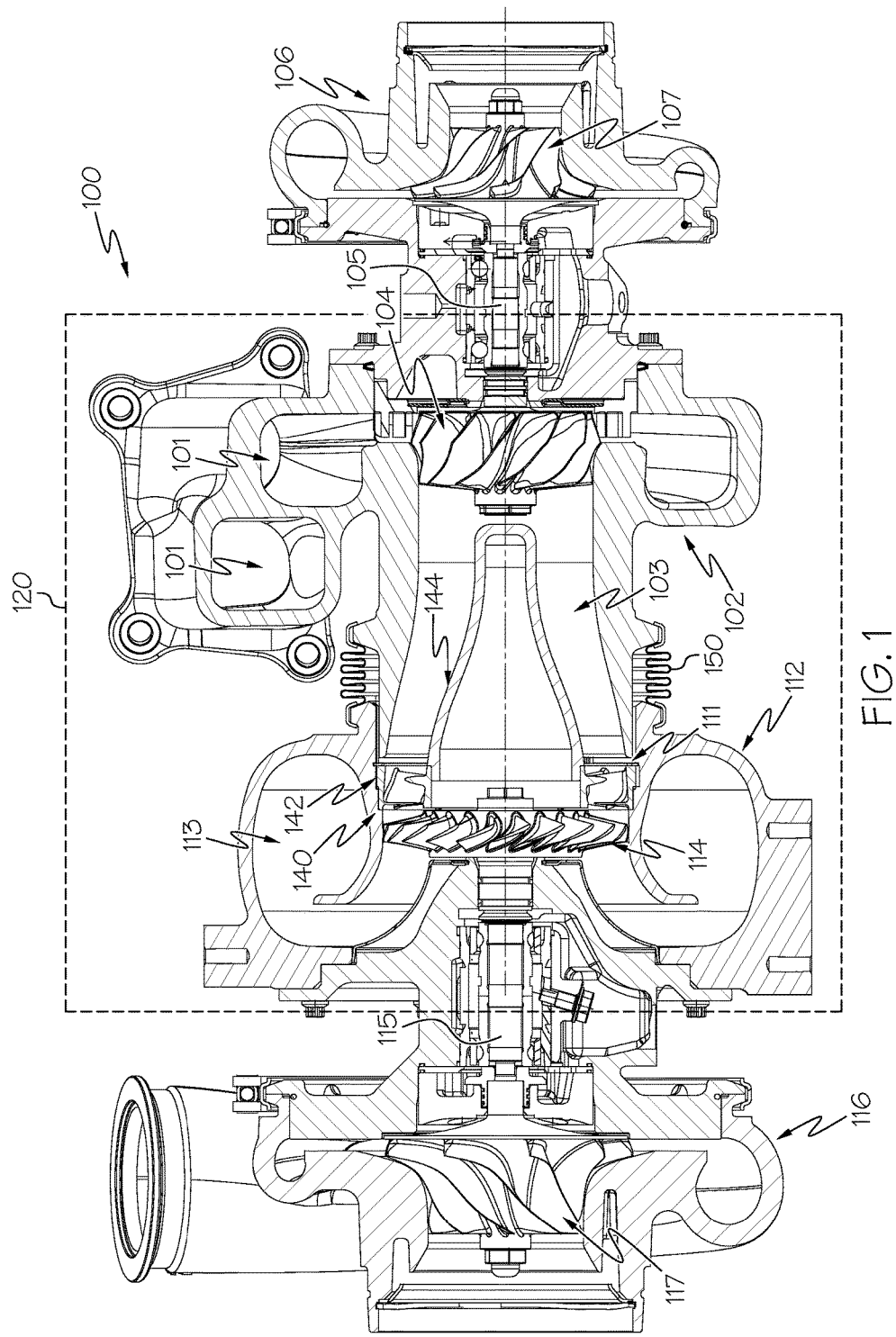
FIG. 1 is a cross-sectional view of a two-stage turbocharger system in one or more exemplary embodiments.

Embodiments of the subject matter described herein relate to turbocharger systems that include serial coaxial turbine stages that interface directly with one another without reliance on any intervening components. At least an end portion of the housing defining one of the first turbine outlet or the second turbine inlet radially circumscribes, encompasses, or otherwise surrounds at least a proximate end portion of the housing defining the other of the first turbine outlet or the second turbine inlet inserted therein. In this regard, an inner surface of the surrounding portion of the outer turbine housing directly face or are otherwise adjacent to the outer surface of the inserted portion of the inner turbine housing without any intervening components between the facing surfaces. Thus, gas flow from the first turbine outlet flows directly into the second turbine inlet without any intervening ducting, and accordingly, the turbines may be understood as directly interfacing with one another. An additional sealing structure circumscribes or otherwise surrounds the end portion of one of the turbine housings, and the sealing structure is joined or otherwise affixed to the turbine housings in a manner that hermetically seals the turbine interface. In exemplary embodiments, the sealing structure circumscribes the outer turbine housing and extends towards the other turbine to maintain the seal while accommodating axial mobility of the turbines with respect to one another. At the same time, it should be noted that the outer turbine housing restricts radial mobility of the inner turbine housing, thereby ensuring smooth gas flow substantially aligned in the axial direction at the turbine interface.

In exemplary embodiments, the first turbine is a radial turbine and the second turbine is an axial turbine, with the rotational axes of the respective turbine wheels being concentrically aligned in an axial direction. As described in greater detail below in the context of FIGS. 2-3 and 5, in one or more embodiments, the inlet portion of the second turbine housing radially surrounds the end portion of the outlet portion of the first turbine housing. In such embodiments, the second turbine inlet portion restricts radial displacement of the first turbine outlet with respect to the second turbine to maintain gas flow at the fluid interface substantially aligned in the axial direction. At the same time, the sealing structure may accommodate axial mobility of the turbines with respect to one another. In one or more alternative embodiments, as described in greater detail below in the context of FIG. 4, the outlet portion of the first turbine housing radially surrounds the end portion of the inlet portion of the second turbine housing. Similarly, in such embodiments, the first turbine outlet portion restricts radial displacement of the second turbine inlet with respect to the first turbine to maintain gas flow at the fluid interface substantially aligned in the axial direction.

FIG. 1 depicts an exemplary embodiment of a two-stage turbocharger system 100 that includes turbine assembly 120 having a direct fluid interface between turbines 102, 112. In practice, the turbocharger system 100 may be designed for and utilized with any sort of automotive vehicle, such as, for example, heavy-duty or performance vehicles to light-duty vehicles. The exhaust manifold(s) receives exhaust gases from the cylinders of the vehicle engine, which are directed to one or more fluid inlets 101 of a first turbine 102. The fluid outlet 103 of the first turbine 102 interfaces directly with the fluid inlet 111 of a second turbine 112, thereby providing a path for exhaust gas flow from the first turbine outlet 103 directly into the second turbine inlet 111, as described in greater detail below. The exhaust gases exiting the outlet 113 of the second turbine 112 are directed to the vehicle exhaust system for further handling and venting, as appropriate.

By virtue of the so-called "series" configuration of the turbines 102, 112, the pressure of the input exhaust gases at the first turbine inlet 101 is greater than the pressure of the exhaust gases at the second turbine inlet 111, and accordingly, the first turbine 102 may alternatively be referred to herein as the high-pressure turbine while the second turbine 112 may alternatively be referred to herein as the low-pressure turbine. In exemplary embodiments, the first turbine 102 is realized as a radial turbine having its outlet 103 configured so that the exiting exhaust gases flow in a direction substantially aligned with the axis of rotation for the first turbine wheel 104 (or substantially orthogonal to the plane of the turbine wheel). The second turbine 112 is realized as an axial turbine having its axis of rotation substantially aligned with the axis of rotation of the first turbine 102. In this regard, rotation axes of the turbines 102, 112 may be coaxially and concentrically aligned.

In the illustrated embodiment, a first compressor 106 has its compressor wheel (or impeller) 107 mounted or otherwise coupled to the first turbine wheel 104 on a common rotary shaft 105, and a second compressor 116 has its impeller 117 mounted or otherwise coupled to the second turbine wheel 114 on a common rotary shaft 115. Thus, both the compressors 106, 116 and the turbines 102, 112 may be coaxially and concentrically aligned about the longitudinal axis of the assembled turbocharger system 100. The second compressor 116 may be arranged to receive inlet air (e.g., downstream of an air filter) for compression to provide charge air for the vehicle engine, which, in turn, may be provided to the first compressor 106 for further charging (e.g., supercharging), either directly or indirectly via a cooling device (e.g., an intercooler). The charge air output from the first compressor 106 may be further cooled by a charge air cooler before provision to the engine intake or inlet manifold.

Figure 2:
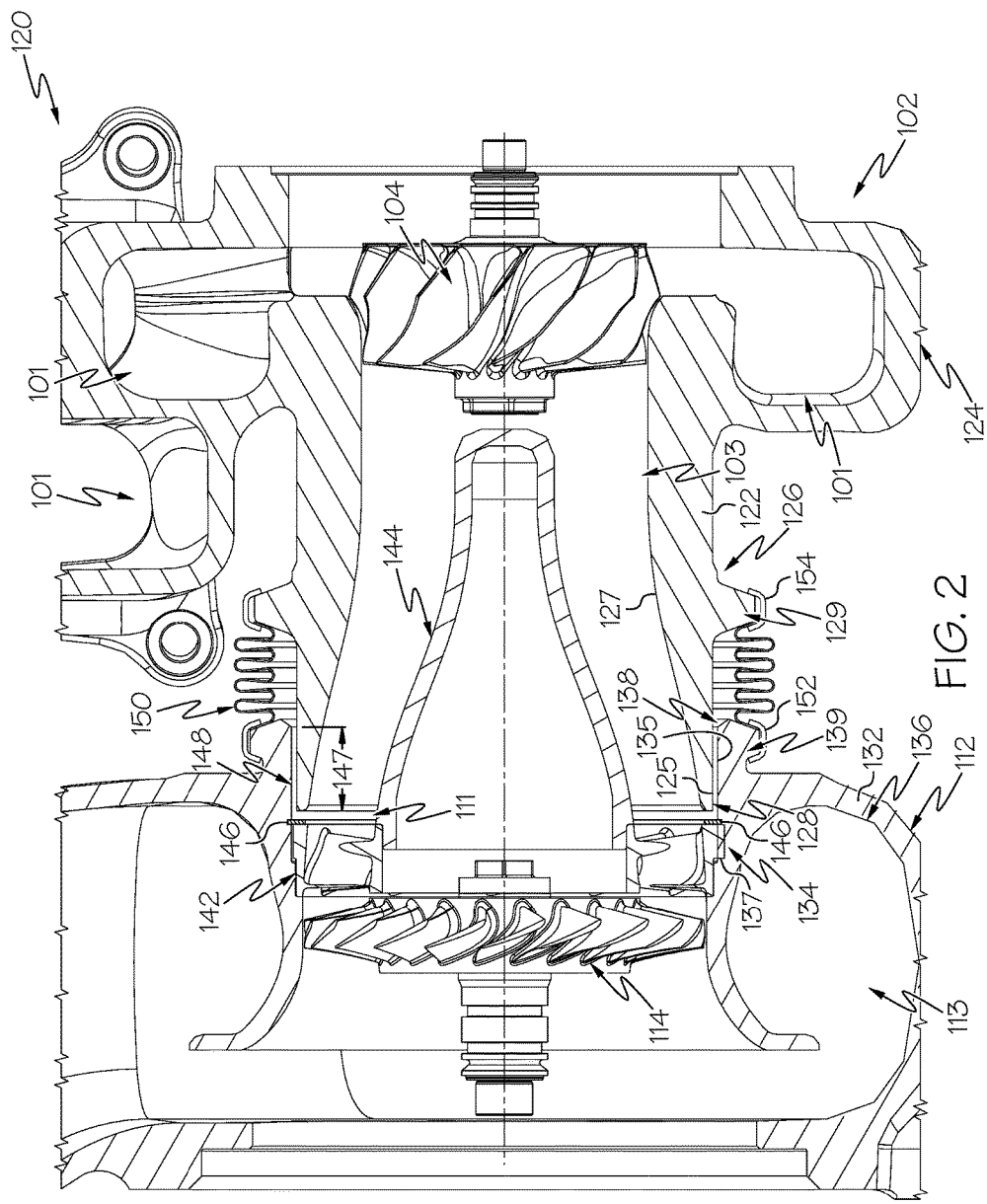
FIG. 2 is a cross-sectional view of a directly interfacing turbine assembly suitable for use in the turbocharger system of FIG. 1 in an exemplary embodiment.
Figure 3:
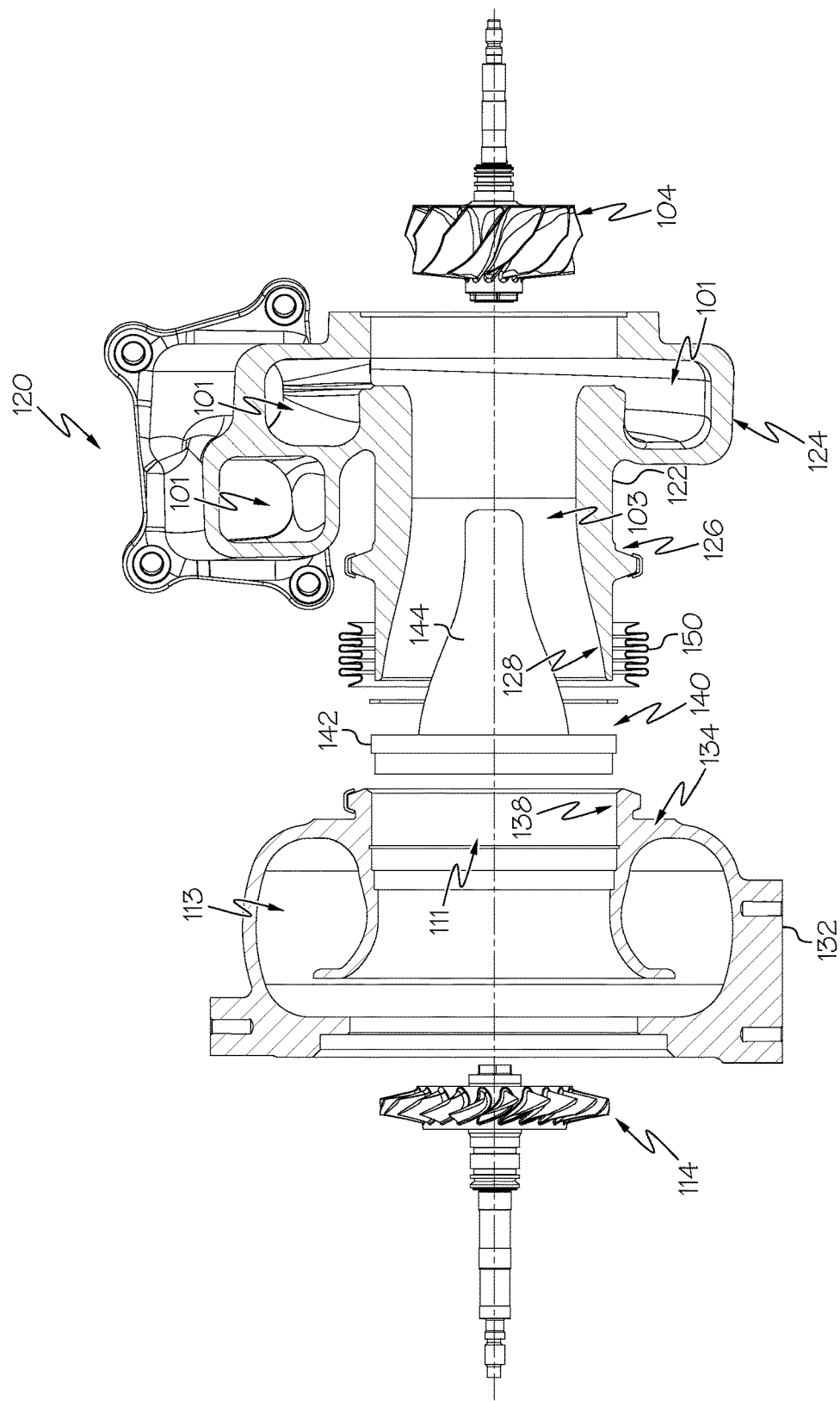
FIG. 3 is an exploded cross-sectional view of the turbine assembly of FIG. 2.

FIGS. 2-3 depict cross-sectional views of the turbine assembly 120 in the turbocharger system 100 of FIG. 1. As described above, the first turbine 102 is realized as a radial turbine with a first turbine housing 122 that includes a hollow or voided volute portion 124 about the first turbine wheel 104 that defines a radial fluid inlet 101 to the first turbine 102 that radially directs input exhaust gas flow towards the turbine wheel 104. The first turbine housing 122 also includes a hollow or voided outlet portion 126 that extends axially away from the turbine wheel 104 towards the second turbine 112 and defines an axial fluid outlet 103 from the first turbine 102. The outer circumference (or diameter) of the end (or exit) portion 128 of the outlet portion 126 distal to the first turbine wheel 104 is less than the inner circumference (or diameter) of the adjacent end (or entry) portion 138 of the second turbine inlet portion 134 distal to the second turbine wheel 114, so that the end portion 128 of the first turbine outlet 126 is directly inserted within the second turbine inlet 134. In other words, the outer surface 125 of the end portion 128 of the first turbine housing 122 directly faces or is otherwise immediately adjacent to the inner surface 135 of the entry portion 138 of the second turbine housing 132.

In the illustrated embodiment, the inner surface 127 of the first turbine outlet portion 126 is tapered away from the rotational axis of the first turbine wheel 104 so that the inner diameter (or circumference) of the outlet portion 126 increases from the first turbine wheel 104 towards the exit end 128 of the first turbine outlet 126. However, in alternative embodiments, the inner diameter (or circumference) of the outlet portion 126 may be maintained constant or decrease downstream from the first turbine wheel 104. In exemplary embodiments, the inner surface 127 of the first turbine outlet 126 is contoured to conform or otherwise correspond to the contour of the outer surface of an axially-extending and substantially-conical stator portion 144 disposed therein, whereby the inner surface 127 of the first turbine outlet 126 and the conical portion 144 cooperatively define a diffuser that adjusts the exhaust gas flow characteristics downstream of the first turbine 102. For the illustrated embodiment in FIGS. 2-3, the radial area of the diffuser (e.g., the area between inner surface 127 and the conical portion 144) increases outwardly downstream of the first turbine 102 towards the second turbine inlet 111 to reduce the Mach number and also reduce the tangential velocity of the exhaust gas flow at the second turbine inlet 111. At the same time, the diffuser is designed to reduce or otherwise minimize pressure losses exhibited by the exhaust gas flow at the second turbine inlet 111.

As described above, the second turbine 112 is realized as an axial turbine with the second turbine housing 132 including a hollow or voided inlet portion 134 about the second turbine wheel 114 that defines the second turbine inlet 111 and extends in the axial direction towards the first turbine 102 to receive axially input exhaust gas flow. The inner circumference (or diameter) of the end (or entry) portion 138 of the inlet portion 134 distal to the second turbine wheel 114 is greater than the outer circumference (or diameter) of the facing exit portion 128 of the first turbine 102 to directly receive the exit portion 128 of the first turbine outlet 126. In this manner, at least a portion of the second turbine inlet portion 134 radially surrounds or otherwise encompasses at least the outlet exit portion 128 of the first turbine housing 122. The second turbine housing 132 also defines a radial outlet portion 136 for providing the exhaust gas to a downstream vehicle exhaust system or the like.

The difference between the inner diameter of the second turbine entry portion 138 and the outer diameter of the first turbine exit portion 128 that is radially surrounded by the second turbine entry portion 138 is chosen to provide a radial air gap 148 that accommodates fabrication, assembly, or installation tolerances. For example, the first turbine inlet 101 may be connected to the engine exhaust manifold(s), which is connected to the engine block via the cylinder head. Thus, the engine block provides physical support for the first turbine 102. Additionally, the second turbine 112 may also be physically supported by the engine block, for example, by the second turbine housing 132 being connected to the engine block via a separate mounting or support structure. As a result, the turbines 102, 112 and the engine block may be configured in a ring-like arrangement, with the air gap 148 providing clearance between the mating portions 128, 138 of the turbines 102, 112 that accommodates installation or assembly while also preventing the turbine housings 122, 132 from contacting one another during operation. In this regard, based on the rigidity of the turbine housings 122, 132 and any other structures facilitating mounting the turbine housings 122, 132 to the engine block, the dimension of the air gap 148 may then be chosen that is unlikely to result in physical contact between the housings 122, 132 during operation due to vibrations or the like. In exemplary embodiments, the air gap 148 is chosen to be about 2 millimeters (plus or minus manufacturing and installation variations or tolerances).

In exemplary embodiment, the second turbine entry portion 138 radially overlaps the first turbine exit portion 128 for a distance 147 in the axial direction that discourages or otherwise reduces the likelihood of gas flow at the fluid interface in a non-axial direction. As a result, the exhaust gas flow path at the direct fluid interface between the exit of the first turbine outlet 103 and the input to the second turbine inlet 111 is maintained substantially aligned with the coincident turbine axes with minimal "leakage" flow within the air gap 148. In other words, the input gas to the axial second stage turbine 112 (neglecting the influence of the vane assembly 142) is substantially aligned with the rotational axis of the axial second stage turbine 112. The overlapping distance 147 also reduces the distance between mounting features 129, 139 to be spanned by the sealing structure 150, as described in greater detail below. Accordingly, the overlapping distance 147 may be optimized for a particular application to achieve a desired length for the sealing structure 150 and desired flow characteristics at the turbine interface for a particular axial length of the turbine assembly 120. Additionally, it is noted that in exemplary embodiments, each of the turbine housings 122, 132 are comprised of a substantially rigid or inflexible material, such that the second turbine entry portion 138 would restrict or otherwise limit radial movement of the first turbine 102 with respect to the second turbine 112 to the width of the air gap 148.

In the illustrated embodiment, the inner surface 135 of the second turbine inlet portion 134 of the second turbine housing 132 between the second turbine wheel 114 and the first turbine exit 128 is contoured, machined, or otherwise configured to receive and retain the vane assembly portion 142 of the stator assembly 140. For example, the inner surface 135 of the second turbine inlet portion 134 may include grooves or similar features 137 corresponding to the outer surface of the vane assembly 142. In the illustrated embodiment, the inner surface 135 of the second turbine inlet portion 134 also includes a groove or similar feature configured to receive or otherwise retain (both axially and radially outward) one or more retaining features 146 (e.g., one or more retaining clips), which, in turn, retain the stator assembly 140 axially. The vane assembly 142 includes a plurality of guide vanes configured to direct or otherwise influence the input exhaust gas flow before impacting the axial turbine wheel 114 to achieve a desired operation of the second turbine 112. In exemplary embodiments, the vane assembly 142 includes a central (or interior) voided portion adapted to receive an end of the diffuser cone 144, which, in turn, is mounted, affixed, or otherwise joined to the vane assembly 142 to provide a unitary stator assembly 140 housed within the second turbine inlet 111. In exemplary embodiments, an axial air gap is provided between the end portion 128 of the first turbine outlet portion 126 and the vane assembly 142 to provide clearance so that the first turbine outlet end portion 128 does not contact the stator assembly 140 and/or the vane assembly 142 during operation. As illustrated, at least a portion of the diffuser cone 144 extends into the first turbine outlet 103, and the diffuser cone 144 is radially circumscribed or otherwise surrounded by at least the exit portion 128 of the first turbine outlet 126. The portion of the first turbine outlet 126 that radially encompasses that portion of the diffuser cone 144 is itself radially circumscribed or otherwise surrounded by at least the entry portion 138 of the second turbine inlet 134. In other words, at least a portion of the diffuser cone 144 is overlapped radially by both the first turbine outlet portion 126 and the second turbine inlet portion 134.

The overlapping portions of the first turbine outlet 126 and the second turbine inlet 134 define the interface between the first turbine fluid outlet 103 and the second turbine fluid inlet 111. In exemplary embodiments, a sealing structure 150 is provided at the interface between the turbine housings 122, 132 to hermetically seal the first turbine fluid outlet 103 with the second turbine fluid inlet 111. The illustrated sealing structure 150 is realized as a bellows-like structure that overlaps or otherwise radially surrounds at least a portion of the entry portion 138 of the second turbine inlet 134 and at least a portion of the first turbine outlet 126 axially adjacent to the entry portion 138 of the second turbine inlet 134. In one or more embodiments, the sealing structure 150 extends longitudinally from the second turbine inlet 134 towards a feature 129 on the outer surface of the first turbine outlet 126 where the sealing structure 150 is joined or otherwise affixed to the first turbine housing 122. For example, as illustrated, the outer surface of the entry portion 138 of the second turbine inlet 134 may include a flange or similar physical feature 139 for receiving a first end of the sealing structure 150 and the outer surface of the first turbine outlet 126 may include another flange or similar physical feature 129 for receiving the opposing end of the sealing structure 150, with the respective ends of the sealing structure 150 being joined or otherwise affixed to the respective features 129, 139 using fastening elements 152, 154.

In one embodiment, the fastening elements 152, 154 are realized as V-band clamps that compress the ends of the bellows sealing structure 150 with the flanges 129, 139 on the turbine housings 122, 132 to hermetically seal ends of the sealing structure 150, and thereby hermetically the interface between the turbines 102, 112. That said, other types of fastening elements 152, 154 may be utilized, including, for example, Marman clamps, adhesives, or the like. In exemplary embodiments, the sealing structure 150 is flexible and provides at least some elasticity in the axial direction so that the turbine housings 122, 132 may move towards or away from one another axially without compromising the exhaust gas flow input to the second turbine inlet 111, which is guided in the axial direction by virtue of the diffuser cone 144 and the second turbine inlet 134 at the exit of the first turbine outlet 126. It should be noted that in alternative embodiments, in lieu of or in addition to a sealing structure 150 surrounding and sealing the overlap of the turbine housings 122, 132, a sealing structure may be provided within the air gap 148 between the turbine housings 122, 132 to hermetically seal the fluid interface. In yet other embodiments, the ends of the sealing structure 150 can be welded, glued, or otherwise joined to the turbine housings 122, 132, in which case separate fastening elements may not be present in such embodiments.

In the illustrated embodiment, the outlet portion 126 of the first turbine housing 122 extends in the axial direction from the turbine wheel 104 towards the second turbine 112 by a distance that is greater than the maximum axial dimension of the radial inlet portion 124. In other words, the longitudinal dimension of the first turbine outlet portion 126 in the axial direction is greater than the dimension of the first turbine inlet portion 124 in the axial direction, so that the first turbine outlet portion 126 extends from the turbine wheel 104 beyond the inlet portion 124 to provide clearance for assembly with the second turbine housing 132. That said, in other embodiments, the longitudinal dimension of the first turbine outlet portion 126 in the axial direction may be less than the dimension of the first turbine inlet portion 124 in the axial direction.

Figure 4:
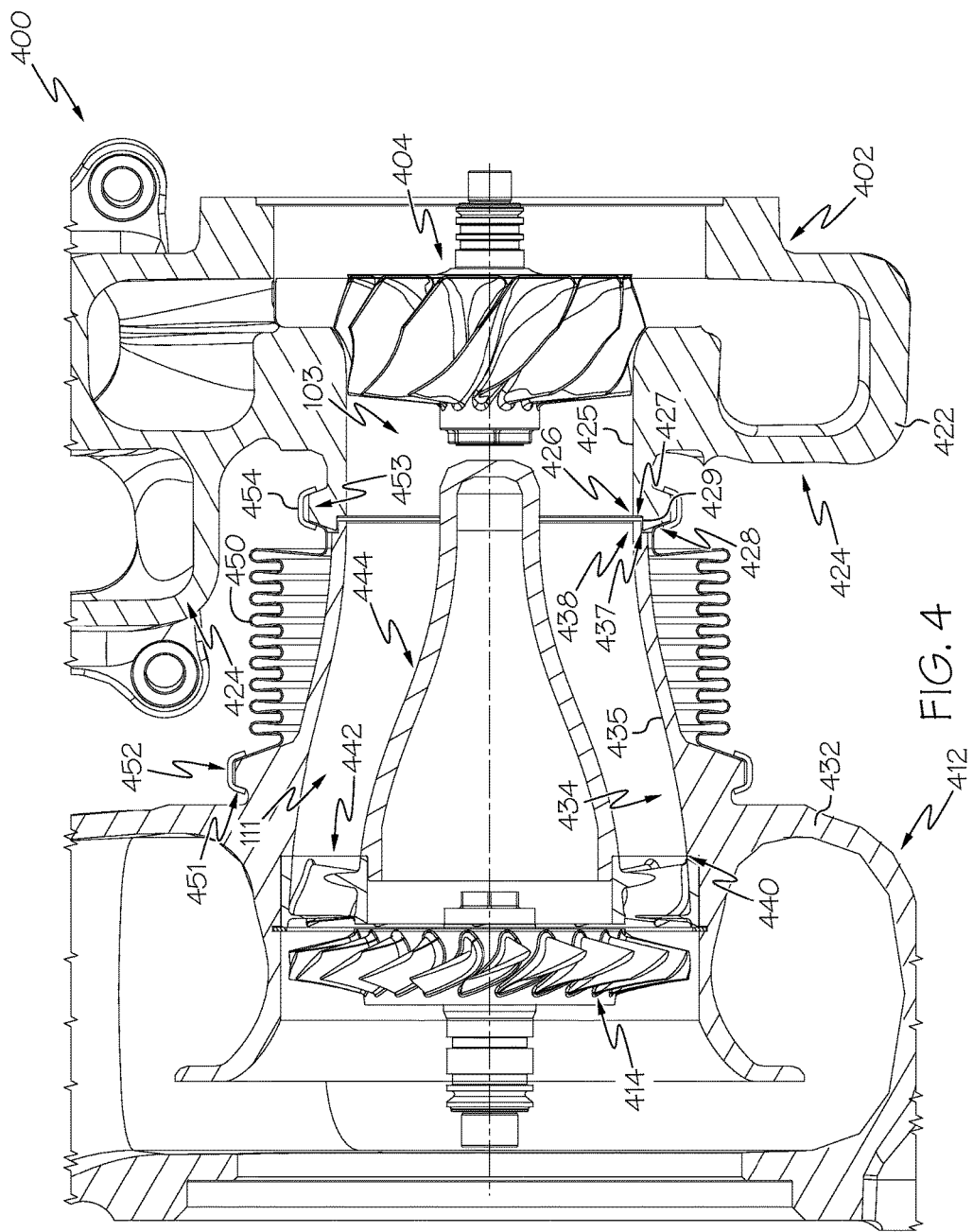
FIG. 4 is a cross-sectional view of another embodiment of a directly interfacing turbine assembly suitable for use in the two-stage turbocharger system of FIG. 1 in accordance with one or more exemplary embodiments.

FIG. 4 depicts another embodiment of a turbine assembly 400 suitable for use as the turbine assembly 120 in the turbocharger system 100 of FIG. 1. Various elements or features of the turbine assembly 400 of FIG. 4 are similar to their counterparts described above in the context of FIGS. 1-3, and accordingly, for the sake of brevity, such common elements or features and related functionality will not be redundantly described in the context of FIG. 4.

In the illustrated embodiment, the inlet portion 434 of the second turbine housing 432 is inserted within the outlet portion 426 of the first turbine housing 422. In this regard, the inner diameter (or circumference) of an end (or exit) portion 428 of the hollow or voided outlet portion 426 that extends axially towards the second turbine 412 is greater than the outer diameter (or circumference) of the adjacent end (or entry) portion 438 of the second turbine inlet portion 434, so that the entry end 438 of the second turbine inlet 434 is directly inserted within the exit end 428 of the first turbine outlet 426. Thus, the outer surface of the entry portion 438 of the second turbine housing 432 is directly facing or otherwise immediately adjacent to the inner surface of the exit portion 428 of the first turbine housing 422.

In the illustrated embodiment, the inner surface 425 of the first turbine outlet portion 426 is aligned substantially parallel to the rotational axis of the first turbine wheel 404 to define a flow path for the exhaust gas within the first turbine outlet 426 that is parallel to the rotational axis. A lip or similar recessed physical feature 427 for receiving the second turbine inlet 434 is formed in the end portion 428 of the first turbine outlet 426, and the inner circumference (or diameter) defined by the inner surface 429 of the lip 427 is greater than the inner circumference (or diameter) defined by the inner surface 425 of the remaining portion of the first turbine outlet 426. In exemplary embodiments, a corresponding lip or similar physical feature 437 for insertion within or otherwise mating with the lip 427 in the exit end 428 of the first turbine outlet 426 is formed in the entry end 438 of the second turbine inlet 434. In this regard, the outer circumference (or diameter) defined by the outer surface of the inlet lip 437 is less than the inner circumference (or diameter) defined by the inner surface of the outlet lip 427 to provide a radial air gap, which accommodates installation or assembly while also preventing the turbine housings 422, 432 from contacting one another during operation. In a similar manner as described above, the outlet lip 427 overlaps the inlet lip 437 in the axial direction to discourage or otherwise reduce the likelihood of gas flow at the fluid interface in a non-axial direction. In some embodiments, the facing surfaces of the mating features 427, 437 may be contoured or otherwise configured to provide a labyrinthine air gap to minimize any "leakage" flow at the turbine interface, which improves efficiency and reduces thermal stress on the sealing structure 450 that could otherwise be caused by exposure to the relatively high temperature exhaust gas. In exemplary embodiments, the length of the inlet lip 437 in the axial direction is substantially equal to the length of the outlet lip 427. Physical contact between the inlet lip 437 with the outlet lip 427 restricts radial displacement of the second turbine 112 with respect to the first turbine 102, and also, restricts axial displacement of the second turbine 112 towards the first turbine 102 (e.g., in the direction opposite the axial flow direction). Thus, during assembly, the turbines 102, 112 can be adjusted or repositioned with respect to one another (e.g., while mounting to the engine block) without damaging the sealing structure 450.

In exemplary embodiments, the inner surface 435 of the second turbine inlet portion 434 at the entry end 438 is aligned substantially parallel with the inner surface 425 of the first turbine outlet 426 to facilitate maintaining a relatively smooth flow of exhaust gas exiting the first turbine outlet 103 at the fluid interface with the second turbine inlet 111 in the axial direction. Additionally, the first turbine outlet exit portion 428 restricts or otherwise limits radial movement of the second turbine 412 with respect to the first turbine 402 to a negligible amount, and as a result, the exhaust gas flow path at the exit of the first turbine outlet 103 is maintained substantially aligned with the axial turbine rotational axis.

In the illustrated embodiment, the inner surface 435 of the second turbine inlet portion 434 is tapered away from the rotational axis so that the inner circumference (or diameter) of the inlet portion 434 increases from the entry end 438 towards the second turbine wheel 414. In exemplary embodiments, the inner surface 435 of the second turbine inlet 434 is contoured to conform or otherwise correspond to the contours of the outer surfaces of a diffuser cone portion 444 disposed therein. As described above in the context of FIGS. 2-3, the diffuser cone 444 is mounted, affixed, or otherwise joined to a stator assembly 440 disposed within the second turbine inlet portion 434. In a similar manner as described above, the diffuser cone 444, in concert with the contours of the second turbine inlet surface 435, adjusts characteristics of the exhaust gas flow while minimizing pressure losses (e.g., by attempting to maintain the pressure of the exhaust gas flow at the vane assembly 442 at or near the pressure of the exhaust gas entering the second turbine inlet portion 434 from the exit end 428 of the first turbine outlet 426). As illustrated, at least a portion of the diffuser cone 444 extends into and is radially circumscribed or otherwise surrounded by at least the exit portion 428 of the first turbine outlet 426, and at least a portion of the first turbine outlet exit portion 428 that radially encompasses the diffuser cone 444 also radially circumscribes or otherwise surrounds at least a portion of the second turbine entry portion 438. In other words, at least a portion of the diffuser cone 444 is overlapped in the radial direction by both the first turbine outlet 426 and the second turbine inlet 434.

In a similar manner as described above, the overlapping portions of the first turbine outlet 426 and the second turbine inlet 434 define the interface between the first turbine fluid outlet 103 and the second turbine fluid inlet 111, and a sealing structure 450 is provided at the interface to hermetically seal the first turbine fluid outlet 103 with the second turbine fluid inlet 111. For example, a bellows-like structure 450 that overlaps or otherwise radially surrounds at least a portion of the first turbine outlet exit 428 proximate the second turbine 412 and extends longitudinally towards the second turbine 412 to overlap, and thereby seal the turbine interface. In a similar manner as described above, the outer surface of the exit portion 428 of the first turbine outlet 426 may include a flange 453 for receiving a first end of the sealing structure 150 and the outer surface of the second turbine inlet 434 may include another flange 451 for receiving the opposing end of the sealing structure 450, with the respective ends of the sealing structure 450 being joined or otherwise affixed to the respective flanges 451, 453 using fastening elements 452, 454 that seal the ends of the sealing structure 450.

In the illustrated embodiment, the outlet portion 426 of the first turbine housing 422 extends in the axial direction from the turbine wheel 404 towards the second turbine 412 by a distance that is less than the maximum axial dimension of the radial inlet portion 424 of the housing 422. In other words, the longitudinal dimension of the first turbine outlet portion 426 in the axial direction is less than the dimension of the radial turbine inlet portion 424 in the axial direction, so that the radial turbine inlet portion 424 extends from the turbine wheel 404 beyond the outlet portion 426 to reduce the longitudinal dimension of the turbine assembly 400 in the axial direction. That said, in other embodiments, the longitudinal dimension of the first turbine outlet portion 426 in the axial direction may be greater than the dimension of the first turbine inlet portion 424 in the axial direction.

Figure 5:
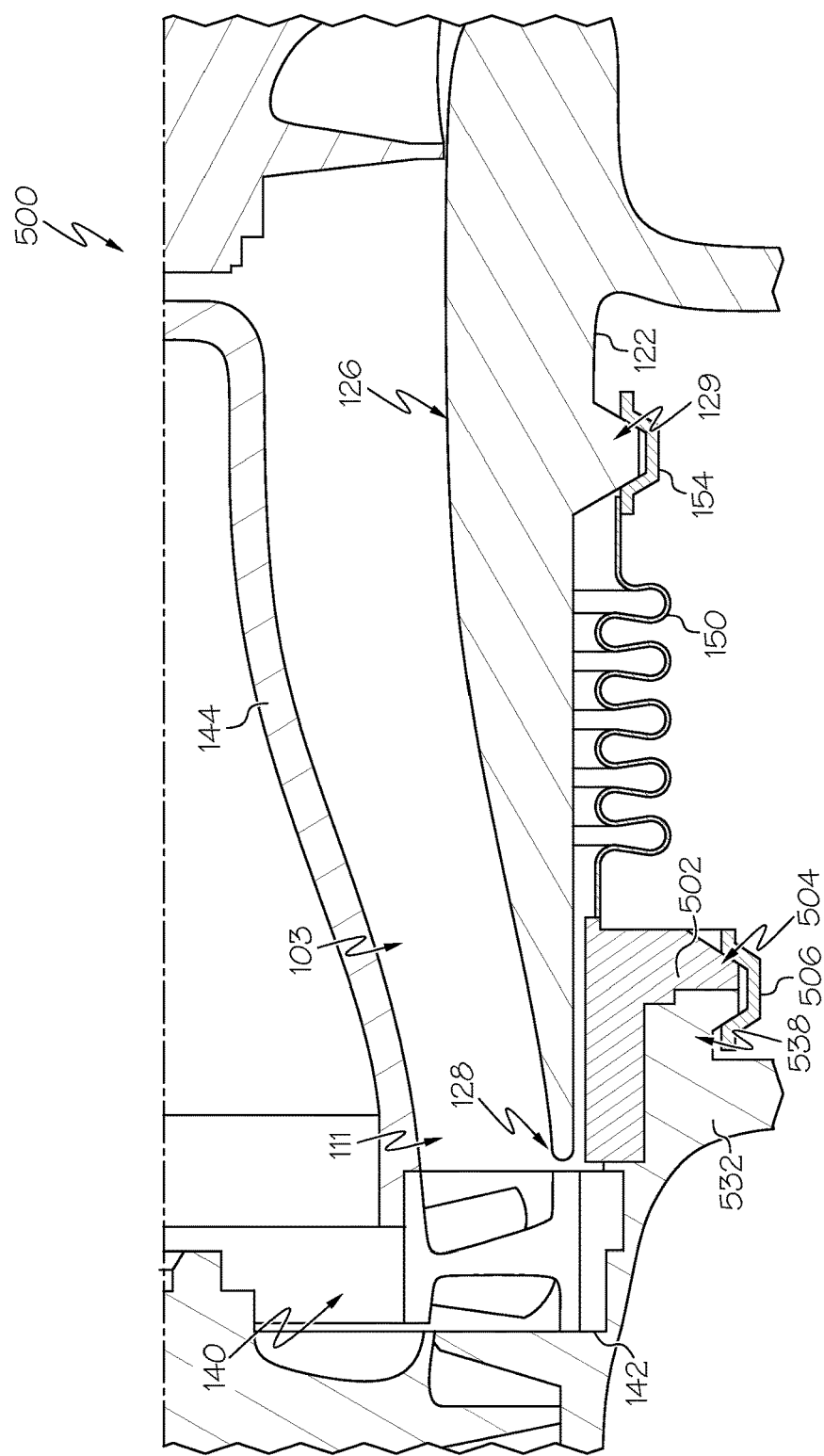
FIG. 5 is a partial cross-sectional view of another embodiment of a directly interfacing turbine assembly suitable for use in the turbocharger system of FIG. 1 in another exemplary embodiment.

FIG. 5 depicts a partial cross-sectional view of another embodiment of a turbine assembly 500 suitable for use as the turbine assembly 120 in the turbocharger system 100 of FIG. 1. Various elements or features of the turbine assembly 500 of FIG. 5 are similar to their counterparts described above in the context of FIGS. 1-3, and accordingly, for the sake of brevity, such common elements or features and related functionality will not be redundantly described in the context of FIG. 5. The turbine assembly 500 is similar to the turbine assembly 120 of FIGS. 1-3, however, the turbine assembly 500 differs in that the vane assembly 142 of the stator assembly 140 is retained axially by a retaining structure 502 that is joined, mounted, or otherwise affixed to the second turbine housing 532. The retaining structure 502 circumscribes the end portion 128 of the first turbine outlet portion 126 in a manner that does not influence the direct fluid interface between the first turbine outlet 103 and the second turbine inlet 111. In exemplary embodiments, the retaining structure 502 includes a flange 504 or similar feature that facilitates joining the retaining structure to the entry portion 538 of the second turbine housing 532 using a fastening element 506, such as a clamp. In this regard, the retaining structure 502 may be effectively hermetically sealed to the entry portion 538 of the second turbine housing 532 to prevent any fluid flow between the retaining structure 502 and the second turbine housing 532. The end of the sealing structure 150 proximate the second turbine 112 is welded or otherwise joined to the retaining structure 502, while the other end of the sealing structure 150 is fastened to the first turbine housing 122, in a similar manner as described above. Thus, the retaining structure 502 and the sealing structure 150 cooperatively seal the interface between the turbines 102, 112, with the retaining structure 502 and the fastening element 506 cooperatively retaining the stator assembly 140 within the second turbine inlet 111.

For the sake of brevity, conventional techniques related to turbines, compressors, turbochargers, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically.

Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A turbine assembly comprising:
   a first turbine housing having an outlet portion defining a fluid outlet of a first turbine; and
   a second turbine housing having an inlet portion defining a fluid inlet of a second turbine, wherein at least an exit portion of the outlet portion radially surrounds at least an entry portion of the inlet portion to provide a direct interface from the fluid outlet of the first turbine to the fluid inlet of the second turbine in an axial direction without any intervening ducting and a radial air gap without any intervening components between an inner surface of the exit portion of the outlet portion and an outer surface of the entry portion of the inlet portion.

2. The turbine assembly of claim 1, wherein the first turbine comprises a radial turbine and the second turbine comprises an axial turbine.

3. The turbine assembly of claim 2, wherein rotational axes of the radial turbine and the axial turbine are concentrically aligned in the axial direction.

4. The turbine assembly of claim 1, wherein:
   a first end of a seal is joined to an outer surface of the inlet portion; and
   a second end of the seal is joined to an outer surface of the outlet portion.

5. The turbine assembly of claim 1, further comprising a stator assembly housed within the inlet portion of the second turbine, the stator assembly including a diffuser cone portion extending from the second turbine in the axial direction into the fluid outlet.

6. The turbine assembly of claim 5, wherein the exit portion of the outlet portion radially surrounds at least a portion of the diffuser cone portion and the entry portion of the inlet portion is disposed between the portion of the diffuser cone portion and the exit portion of the outlet portion.

7. The turbine assembly of claim 5, wherein an inner surface of the inlet portion is contoured to correspond to a portion of the diffuser cone portion disposed within the fluid inlet.

8. A turbocharger system comprising:
   a first compressor;
   a first turbine coupled to the first compressor and having a first common rotational axis therewith;
   a second turbine having an inlet inserted within an outlet of the first turbine to provide a direct fluid interface for gas flow from the first turbine to the second turbine without any intervening ducting and a radial air gap without any intervening components between an inner surface of an exit end portion of the outlet and an outer surface of an entry end portion of the inlet; and
   a second compressor coupled to the second turbine and having a second common rotational axis therewith, wherein the first common rotational axis and the second common rotational axis are concentric.

9. The turbocharger system of claim 8, further comprising a seal hermetically sealing the inlet of the second turbine with the outlet of the first turbine.

10. The turbocharger system of claim 9, wherein the seal comprises a bellows structure expandable in an axial direction aligned with the first and second common rotational axes.

11. The turbocharger system of claim 8, further comprising a stator assembly disposed within the inlet of the second turbine, wherein the stator assembly includes a diffuser cone portion extending into the outlet of the first turbine.

12. A turbocharger system comprising:
    a first compressor;
    a radial turbine having a first turbine wheel coupled to the first compressor via a first rotary shaft, the radial turbine comprising a first turbine housing defining a radial fluid inlet and an axial fluid outlet;
    a second compressor;
    an axial turbine having a second turbine wheel coupled to the second compressor via a second rotary shaft aligned with the first rotary shaft in an axial direction, the axial turbine comprising a second turbine housing defining an axial fluid inlet, wherein at least a portion of an axial outlet portion of the first turbine housing radially surrounds at least a portion of an axial inlet portion of the second turbine housing to provide a direct fluid interface between the axial fluid outlet and the axial fluid inlet without any intervening ducting and a radial air gap without any intervening components between an inner surface of the axial outlet portion and an outer surface of the axial inlet portion; and
    a seal hermetically sealing the portion of the axial outlet portion to the second turbine housing.

13. The turbine assembly of claim 1, wherein the inner surface of the exit portion of the first turbine housing directly faces the outer surface of the entry portion of the second turbine housing.

14. The turbine assembly of claim 1, further comprising a bellows structure radially surrounding at least the exit portion of the first turbine housing and the entry portion of the second turbine housing, wherein:

a first end of the bellows structure is joined to the outer surface of the inlet portion;

a second end of the bellow structure is joined to an outer surface of the outlet portion; and the bellows structure is flexible in an axial direction.

15. The turbine assembly of claim 1, further comprising a bellows structure radially surrounding at least the portion of the inlet portion and the portion of the outlet portion, wherein:

a first end of the bellows structure is joined to the outer surface of the inlet portion;

a second end of the bellow structure is joined to an outer surface of the outlet portion; and the bellows structure is flexible in an axial direction.

16. The turbine assembly of claim 1, wherein:

the first turbine housing comprises a volute portion about a wheel of the first turbine; and the outlet portion extends away from the wheel of the first turbine towards the second turbine in the axial direction by less than a radial fluid inlet defined by the volute portion.

17. The turbine assembly of claim 1, wherein:

the outlet portion extends axially away from a first wheel of the first turbine towards the second turbine; and the inlet portion extends from a second wheel of the second turbine towards the first turbine in the axial direction.

18. The turbine assembly of claim 1, wherein:

an inner surface of the outlet portion of the first turbine includes a first recess for receiving the inlet portion of the second turbine; and an outer surface of the inlet portion includes a second recess corresponding to the first recess.

19. The turbine assembly of claim 1, wherein the radial air gap is configured to prevent the first turbine housing and the second turbine housing from contacting one another during operation.

20. The turbine assembly of claim 1, wherein an outer circumference defined by the outer surface of the entry portion of the inlet portion is less than an inner circumference defined by the inner surface of the exit portion of the outlet portion to provide the radial air gap.

* * * * *